UNITED STATES PATENT OFFICE.

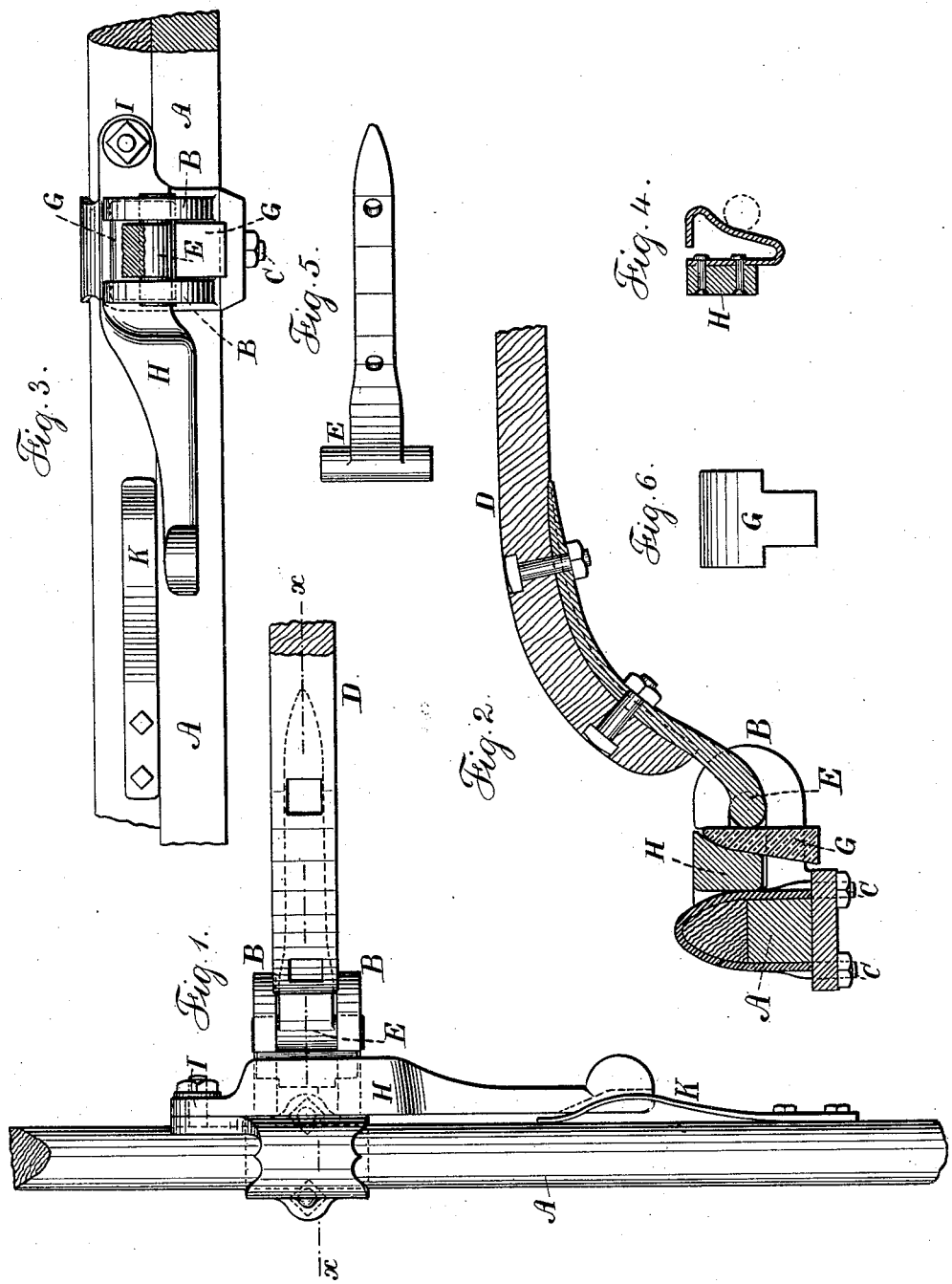

HENRY A. GROUX, OF WEST ORANGE, NEW JERSEY.

THILL-COUPLING.

SPECIFICATION forming part of Letters Patent No. 486,579, dated November 22, 1892.

Application filed May 9, 1892. Serial No. 432,237. (No model.)

*To all whom it may concern:*

Be it known that I, HENRY A. GROUX, a citizen of the United States, residing at West Orange, in the county of Essex and State of New Jersey, have invented an Improvement in Thill-Couplings, of which the following is a specification.

The couplings by which the shafts or poles of carriages are connected to the axle have in some instances been made with hook-shaped joints, so as to be easy of disconnection, and in addition to this the rattling and wear consequent thereon have been lessened by the introduction of rubber blocks under compression; but it has been difficult to introduce or remove the rubber blocks with facility for disconnecting the parts.

By my present improvement the hook-shaped connections support a rubber block, and a swinging wedge is brought in behind the same to force the rubber up against the joint-pin of the coupling so as to prevent rattling, and by swinging the wedge aside the rubber block can be lifted out, and then the shaft or pole is unhooked with facility.

In the drawings, Figure 1 is a plan view of the coupling. Fig. 2 is a cross-section at the line $x\ x$. Fig. 3 is an elevation with the pole-iron in section. Fig. 4 is a cross-section of the wedge-lever in a modified form. Fig. 5 is a plan of the pole-iron separately, and Fig. 6 is a separate view of the rubber block.

The axle A is of ordinary construction, and the hooks B are upon a plate or clip connected to the axle, preferably by the bolts C, and upon the shaft or pole D is the pole-iron with the T-shaped end E, forming the joint-pin, which is received into the hooks B, the pole-iron passing between such hooks, so that the shaft or pole is supported by the hooks, but can be lifted in or out with facility.

The rubber block G is T-shaped, so as to pass down between the hooks and behind the joint-pin E, the T-shaped heads resting upon the horizontal portions of the hooks, and I make use of a wedge H, introduced behind the rubber block G and between the same and the axle to force the rubber block up against the joint-pin E with sufficient force to prevent such joint-pin rattling, and this wedge H is pivoted at one end I upon the axle, so that it will be held properly in position, and a suitable spring K is fitted for holding the moving end of the wedge-lever H. This spring K may be of any desired character; but I find it advantageous to make use of a plate fastened upon the surface of the axle and springing back by the action of the wedge-lever as such wedge-lever is forced down to place.

By pressing the thumb or finger upon the spring K the wedge-lever H can be swung up, relieving the pressure of the wedge portion of the lever from the rubber blocks and allowing such rubber block to be lifted out, thereby opening the hooks, so that the pole-irons can be lifted out with facility, or when the parts are put together they are held securely by a reverse movement given to the parts.

I do not limit myself to the spring being of rubber, as the lever H may be provided with a metal spring having a wedge-shaped surface, as seen in Fig. 4, to pass down behind the joint-pin and press the same forward.

I claim as my invention—

1. The combination, with the pole-iron having a T-shaped joint-pin at the end, of the hooks for receiving such pole-iron and joint-pin, an elastic block behind the joint-pin, and a plate and pivotal connection therefor on the axle, substantially as set forth.

2. The combination, with the shaft or pole-iron having a T-shaped joint-pin, of the hooks for receiving the same, a spring having end projections for closing the hooks and a central portion pressing against the joint-pin, and a swinging lever pivoted on the axle and acting upon the spring, substantially as set forth.

3. The combination, with the hooks, of a pole-iron having a T-end or a joint-pin to be received into the hooks, a rubber block having a T-shaped head and passing down between the hooks, a pivoted lever having a wedge-surface acting upon the rubber block, and a spring for holding the lever in position, substantially as set forth.

Signed by me this 29th day of April, 1892.

HENRY A. GROUX.

Witnesses:
 GEO. T. PINCKNEY,
 WILLIAM G. MOTT.